United States Patent Office.

JAMES C. DUSTAN, OF NEW VERNON, NEW JERSEY.

Letters Patent No. 64,649, dated May 14, 1867.

IMPROVED LINIMENT.

*The Schedule referred to in these Letters Patent and making part of the same.*

TO ALL WHOM IT MAY CONCERN:

Be it known that I, JAMES C. DUSTAN, of New Vernon, Morris county, New Jersey, have invented a new and improved Composition Liniment for the cure of sprains, spavins, and other affections of horses, &c.; and I do hereby declare that the following is a full, clear, and exact description thereof, which will enable others skilled in the art to make and use the same.

This invention or discovery relates to an improved composition liniment, or medical compound for the cure of sprains in the joints of horses and other animals, spavins, ring-bones, splints, poll evil, fistulous withers, string-halt, and other diseases to which horses are especially subject; and it consists in mixing and uniting several well-known medical substances in due proportion, in a manner to render them, when thus combined, very active and powerful curative agents, when administered as a remedy in the class of diseases of horses and other animals, for which, as herein represented, my improved liniment is particularly intended.

The ingredients composing my improved liniment, and their several proportions, are as follows, to wit: Spirits of arnica, seven ounces; alcohol, fifteen ounces; beef gall, four ounces; camphor, two ounces; oil of origanum, two ounces.

In order to mix these ingredients perfectly to form my improved liniment, I dissolve the camphor first in the alcohol, and then add the spirits of arnica, and unite them thoroughly by agitation; the gall of beef is then introduced into the mixture, and thoroughly incorporated by agitation, as before; and lastly I add the oil of origanum, and unite the whole by long-continued agitation, when the composition is ready for use as a liniment, and is to be bottled and corked tightly before any portion of it can evaporate. It is requisite to mix the several ingredients in the order and manner above described, to unite them perfectly and render them most effective when combined to be applied as a liniment.

When thus prepared, my improved liniment is to be applied to the parts affected, after they have been cleansed, by rubbing it thereon with the hand gently, several times daily, until the cure is effected, which requires more or less time, according to the nature and obstinacy of the case; but bad spavins and sprains are usually cured in a few weeks at most.

Having described my invention or discovery, and the mode of its operation and application, I claim as new, and desire to secure by Letters Patent—

An improved liniment, composed of the several ingredients, combined in the proportions and manner substantially as and for the purposes herein specified.

The above specification of my invention signed by me this 1st day of April, 1867.

JAMES C. DUSTAN.

Witnesses:
WM. F. McNAMARA,
ALEX. F. ROBERTS.